3,438,044
MONOPULSE SYSTEM WITH AN
ELECTRONIC SCANNER
Armondo D. Elia, Hillcrest Heights, Md., and Richard F. Schmidt, Washington, D.C., assignors to the United States of America as represented by the Administrator of the National Aeronautics and Space Administration
Filed June 13, 1967, Ser. No. 646,424
Int. Cl. H01q 3/00, 1/00
U.S. Cl. 343—854                    10 Claims

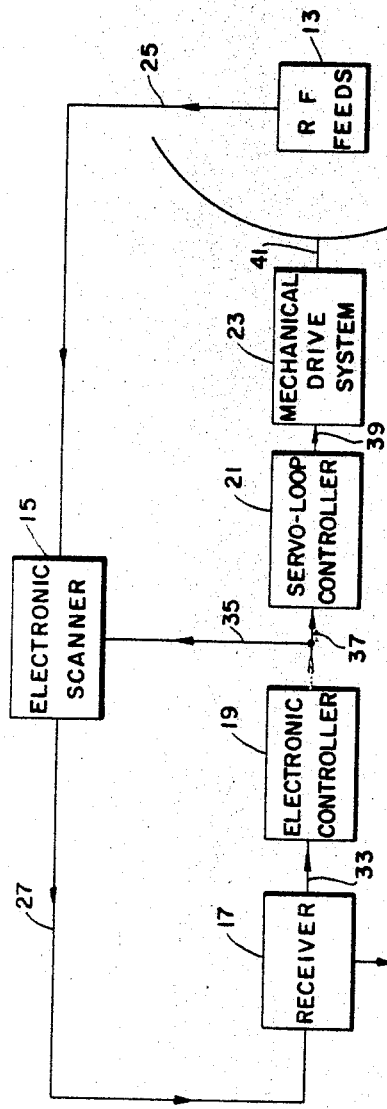
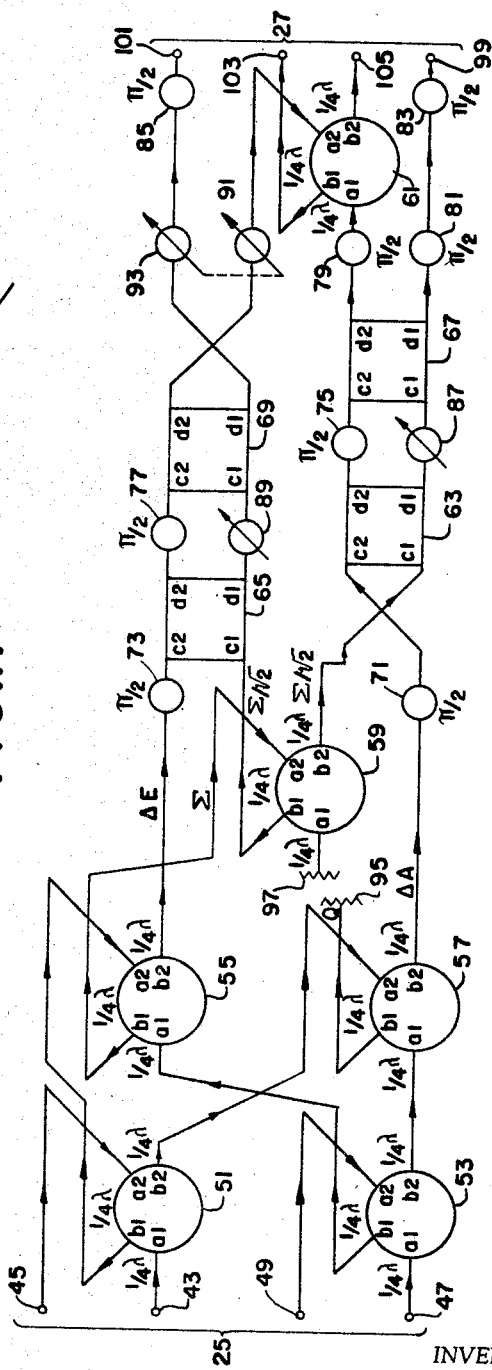
FIG.1.
FIG.2.
INVENTORS
Armondo D. Elia &
Richard F. Schmidt
BY
ATTORNEYS United States Patent Office 3,438,044
Patented Apr. 8, 1969

ABSTRACT OF THE DISCLOSURE

This invention is an electronic sum-and-difference pattern scanning network for use in the control system for a monopulse tracking antenna. The control system provides a means for both mechanically and electronically scanning a target with the mechanical means providing a rough determination of the location of a target and the electronic means providing an exact determination of the location of the target. The electronic pattern scanning network utilizes a plurality of square and ring hybrids and a plurality of phase shifters to scan the sum-and-difference patterns of a monopulse tracking system in a predetermined manner to provide a vernier control system for a monopulse tracking antenna.

This invention was made by a Government employee and may be used by and for the Government for governmental purposes without the payment of any royalties thereon or therefor.

Disclosure

Monopulse tracking systems are well known and widely used. A dual plane monopulse system can comprise an antenna having a horn divided into four quadrants. An RF signal pulse is emitted by the antenna and a signal, reflected by the body being tracked, is received by each horn. Hence, four signals are received. These signals are combined in a sum-and-difference system to develop a sum signal, two difference signals, and a load signal. The sum signal can be related to the distance of the body from the antenna and the difference signals are related to the angular deviation of the body from the axis intersection of the four quadrants of the horn, known as the boresight axis. The difference signals are applied via a receiver to control systems to move the antenna structure to maintain the boresight axis in line with the body being tracked while the sum signal is applied to a receiver to determine the distance of the body from the antenna.

While prior art systems using sum-and-difference systems to control antenna movement have proven satisfactory for relatively small antennas, they are not entirely satisfactory for large modern space data acquisition antennas. Specifically, antennas having 85-foot and greater diameters and weighing several tons have been developed for obtaining data from space vehicles. These antennas use monopulse systems for directing the antenna at (tracking) the vehicle so that the received data signals are of the greatest magnitude.

Because of the size and weight of these antennas, the mechanical systems necessary to support and move them have become bulky and complex. Even with modern, sophisticated servo-techniques, it has become extremely difficult to mechanically maintain the boresight axis of these antennas aligned with the body being tracked. More specifically, as antennas have become bulkier and heavier, control design problems have been imposed by friction in the gears, bearings and hydraulic-drive subsystems. Further, drive-motor speed range, maximum torque, and torque ripple restrictions have become a problem. In addition, other drive and load characteristics have created design problems. Because of these problems, servo-control systems designed for the accuracy and transient response necessary in large antenna systems are complex and demand high levels of performance from critically adjusted components. This leads to systems which require frequent retuning and inherently have less than the desired reliability.

Therefore, it is an object of this invention to provide a new and improved system for use with a monopulse tracking antenna which reduces the need for a highly accurate mechanical servo-control system.

It is a further object of this invention to provide a system for electronically scanning monopulse sum-and-difference patterns to eliminate the necessity for mechanical scanning by antenna movement for small changes in the location of a body being tracked.

It is a still further object of this invention to provide a new and improved apparatus for electronically scanning monopulse sum-and-difference patterns.

In accordance with a principle of this invention, monopulse sum-and-difference patterns are electronically scanned to eliminate the necessity for mechanically moving the antenna for small changes in the movement of the body being tracked. That is, an electronic sum-and-difference pattern transforming network produces new sum-and-difference patterns representative of the original sum-and-difference patterns but shifted in space. The phase shifting transformation is variable, hence, for small target changes it is unnecessary to mechanically move the mechanical boresight axis of the antenna.

In accordance with a further principle of the invention, the incoming monopulse signals are passed through a plurality of square and ring hybrid waveguides in combination with both fixed and variable waveguide phase delays to provide the appropriate electronic scan.

It will be appreciated that the overall system of the invention provides a simple means for eliminating the necessity for accurate mechanical scanning. More specifically, the electronic scanning system of the invention provides for an electronic vernier system to aid the rough mechanical alignment of the antenna to provide an exact monopulse scanning system. In this, manner, the critical mechanical restraints of prior art antenna systems are considerably reduced. Moreover, the system for providing the electronic scan is simple. That is, the scanning circuit comprises a plurality of simple ring hybrids, simple square hybrids, and simple phase delays.

The foregoing objects and many of the attendant advantages of this invention will become more readily appreciated as the same becomes better understood by reference to the following detailed description when taken in conjunction with the accompanying drawings, wherein:

FIG. 1 is a block diagram of the overall control system;

FIG. 2 is a line diagram of an electronic waveguide sum-and-difference pattern scanning network suitable for use with a square monopulse antenna.

Figure 3:
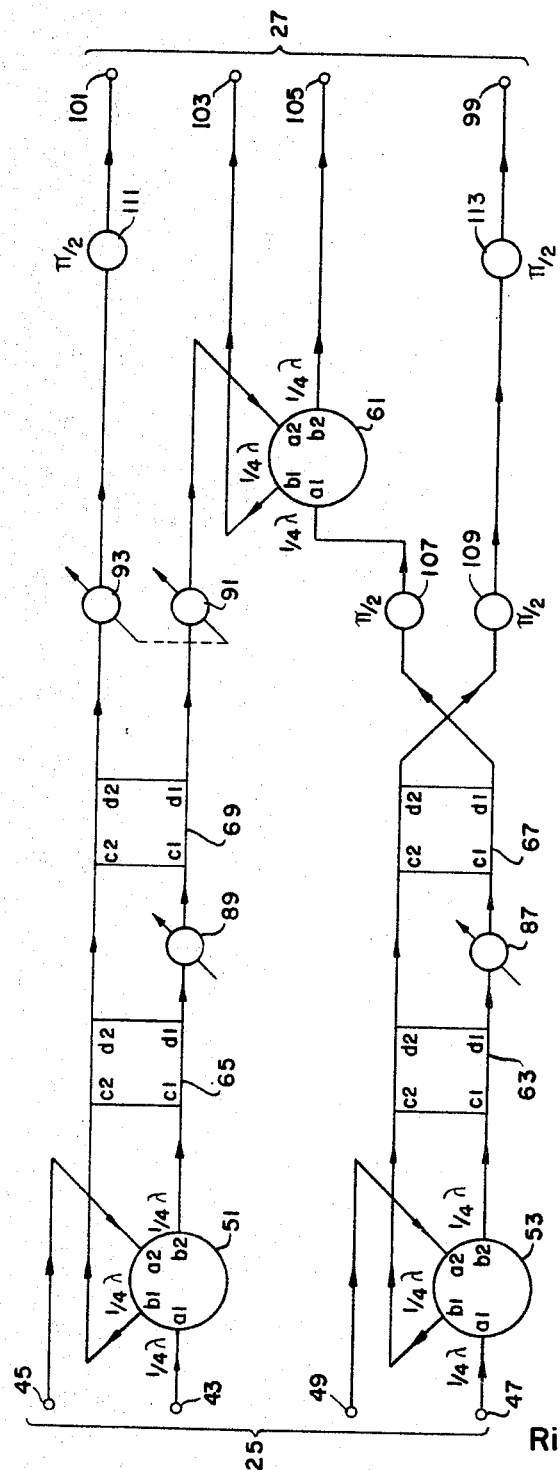
FIG. 3 is a line diagram of an electronic waveguide sum-and-difference pattern scanning network suitable for use with a diamond monopulse antenna.

The system illustrated in FIG. 1 comprises an antenna reflector 11, an RF feed 13, an electronic scanner 15, a receiver 17, an electronic controller 19, a servo-loop controller 21, and a mechanical drive system 23. The signals from the RF feed 13 pass along a line 25 to the input of the electronic scanner 15 and the output of the electronic scanner passes along a line 27 to the input of the receiver 17. The receiver has two outputs; one output is the signal output and passes along a line 29 to a terminal 31; and the second output is the error output and passes along a line 33 to the input of the electronic controller 19. The output from the electronic controller 19 flows along a line 35 to the control input of the electronic scanner and along a line 37 to the input of the servo-loop controller 21. The output from the servo-loop controller passes along a line 39 to the input of the mechanical drive system 23. The mechanical drive system is illustrated as connected to the antenna cone 11 by a line 41.

The electronic scanner 15 is the sum-and-difference pattern scanning network of the invention and is illustrated in FIGS. 2 and 3 and hereinafter described. This electronic scanner receives four signals from the RF feed 13—one signal for each quadrant of the monopulse horn. The scanner 15 electronically processes the four signals in a network comprising hybrid junctions and phase delays to generate sum-and-difference patterns displaced in space from the original sum-and-difference patterns. The phase shifting is controlled by the output from the electronic controller 19.

More specifically, the signals from the electronic scanner pass along a line 27 to the receiver 17. The receiver generates a data output signal along line 29 to a terminal 31. In addition to the data signal, the receiver 17 generates an error output signal along line 33 if the body has deviated from the electronic boresight axis as determined by the pointing of the antenna and by the setting of the scanner. This error signal energizes the electronic controller 19 to generate a correction signal along lines 35 and 37. The correction signal on line 35 changes the phase shifting of the electronic scanner 15 as hereinafter described to reduce the error signal to zero if the error signal is small. If the error is large, the correction on line 37 is recognized by the servo-loop controller 31. The servo-loop controller then energizes the mechanical drive system 23 to move the antenna to a point where the correction signal on line 35 changes the setting of the electronic scanner by an amount that reduces the error signal on line 33 to zero. Hence, the servo-controller provides for a rough adjustment and the electronic scanner provides for a small or vernier adjustment of the electronic boresight axis of the antenna.

It will be appreciated that the invention reduces the prior art requirement that the mechanical boresight axis of the antenna be accurately, mechanically pointed. That is, because the mechanical restrictions on the antenna are greatly reduced, a rougher, easier to design and build antenna movement system is used. As in a conventional system, the error signals from the electronic scanner which pass through the receiver are elevation and azimuth deviation error signals. More specifically, these signals are the azimuth and elevation difference signals from the sum-and-difference pattern scanning network as hereinafter described with respect to FIGS. 2 and 3. In a conventional system, these deviation signals control azimuth and elevation servo-systems that in turn control the mechanical movement of the antenna. However, in accordance with the invention, these signals are used to control the electronic scanner as well as the mechanical drive.

FIG. 2 illustrates one form of a sum-and-difference pattern scanning network suitable for use as the electronic scanner 15 of FIG. 1 when a square-monopulse system is employed (i.e., when deviation in the incoming signal are functions of all four RF feed signals).

The network illustrated in FIG. 2 comprises six ring hybrids 51, 53, 55, 57, 59, 61; four square hybrids 63, 65, 67, 69; eight fixed $\pi/2$ phase delay elements 71, 73, 75, 77, 79, 81, 83, and 85; and four variable phase delay elements 87, 89, 91, and 93. The first and second variable phase delay elements 87 and 89 are separately adjustable and the third and fourth variable phase delay elements 91 and 93 are coupled together for concurrent adjustment as illustrated by a dotted line interconnecting these two elements.

Each ring hybrid and each square hydrid has two inputs and two outputs. For ease of discussion the two inputs of each ring hybrid are designated as $a_1$ and $a_2$, respectively, and the two outputs of each ring hybrid are designated as $b_1$ and $b_2$, respectively. Further, using input $a_1$ as the reference point and moving in a clockwise direction the inputs and outputs of each ring hybrid are located as follows: (1) inputs $a_1$; (2) output $b_1$ separated from $a_1$ by $\frac{1}{4}\lambda$; (3) input $a_2$ separated from $b_1$ by $\frac{1}{4}\lambda$; (4) output $b_2$ separated from $a_2$ by $\frac{1}{4}\lambda$; and (5) input $a_1$ separated from output $b_2$ by $\frac{3}{4}\lambda$. Also, for ease of discussion the two inputs of each square hybrid are adjacent corners and are designated as $c_1$ and $c_2$, respectively. Further, the two outputs of each square hybrid are adjacent corners and are designated as $d_1$ and $d_2$, respectively. Moreover, $c_1$ of each square hydrid is adjacent $d_1$ and $c_2$ is adjacent $d_2$. The separation between adjacent corners of the square hybrids are chosen to be $\frac{1}{4}\lambda$.

The four outputs of the RF feed from the square monopulse horn pass along line 25 of FIG. 1 to four input terminals of FIG. 2 designated 43, 45, 47 and 49. Input 43 is connected to the $a_1$ input of the first ring hybrid 51 and input 45 is connected to the $a_2$ input of the first ring hybrid 51. Similarly, input 47 is connected to the $a_1$ input of the second ring hybrid 53 and input 49 is connected to the $a_2$ input of the second ring hybrid 53.

The $b_1$ output of the first ring hybrid 51 is connected to the $a_2$ input of the third ring hybrid 55 and the $b_1$ output of the second ring hybrid 53 is connected to the $a_1$ input of the third ring hybrid 55. Similarly, the $b_2$ output of the first ring hybrid 51 is connected to the $a_2$ input of the fourth ring hybrid 55 and the $b_2$ output of the second ring hybrid 53 is connected to the $a_1$ input of the fourth ring hybrid 57.

The $b_1$ output of the fourth ring hybrid 57 is connected to a load 95 and the $b_2$ output of the fourth ring hybrid is connected through the first fixed phase-delay element 71 to the $c_2$ input of the first square hybrid 63.

The $a_1$ input of the fifth ring hybrid 59 is connected to a second load 97. The $a_2$ input of the fifth ring hybrid 59 is connected to the $b_1$ output of the third ring hybrid 55. The $b_2$ output of the third ring hybrid 55 is connected through the second fixed phase-delay element 73 to the $c_2$ input of the second square hybrid 65.

The $b_2$ output of the fifth ring hybrid 59 is connected to the $c_1$ input of the first square hybrid 63 and the $b_1$ output of the fifth ring hybrid 59 is connected to the $c_1$ input of the second square hybrid 65. The $d_2$ output of the first square hybrids is connected through the third fixed delay 75 to the $c_2$ input of the third square hybrid 67, and the $d_1$ output of the first square hybrid is connected through the first variable delay 87 to the $c_1$ input of the third square hybrid. Similarly, the $d_2$ output of the second square hybrid 65 is connected through the fourth fixed delay 77 to the $c_2$ input of the fourth square hybrid 69 and the $d_1$ output of the second square hybrid is connected through the second variable delay 89 to the $c_1$ input of the fourth square hybrid 69.

The $d_2$ output of the third square hybrid 67 is connected through the fifth fixed phase delay 79 to the $a_1$ input of the sixth ring hybrid 61. The $d_1$ output of the third square hybrid 67 is connected through the sixth fixed phase delay 81 in series with the seventh fixed phase delay 83 to a first output terminal 99. The $d_2$ output of the fourth square hybrid 69 is connected through the third variable phase delay 91 to the $a_2$ input of the sixth ring hybrid 61 and the $d_1$ output of the fourth square hybrid 69 is connected through the fourth variable phase delay 93 in series with the eighth fixed phase delay 85 to a second output terminal 101. Finally, the $b_1$ output of the sixth ring hybrid 61 is connected to a third output terminal 103 and the $b_2$ output of the sixth ring hybrid is connected to a fourth output terminal 105.

In operation, the first four ring hybrids act as a conventional sum-and-difference network with the sum component $\Sigma$ of the input signals occurring at the $b_1$ output of the third ring hybrid 55 and the load component Q occurring at the $b_1$ output of the fourth ring hybrid 57.

The elevation deviation component ΔE is on the $b_2$ output of the third ring hybrid 55 and the azimuth deviation component ΔA is on the $b_2$ output of the fourth ring hybrid 57.

The fifth ring hybrid 59 acts to split the sum signal so that its $b_1$ and $b_2$ outputs are each equal to the sum component divided by the square root two. One $\Sigma/\sqrt{2}$ signal is combined with the ΔA signal in the subsystem comprising the first and third square hybrids and the first, third, fifth, sixth and seventh fixed phase delays as well as the first variable phase delay to provide a new $\Sigma$ signal and a new ΔA. Similarly, the second $\Sigma/\sqrt{2}$ signal is combined with the ΔE signal in the second and fourth square hybrids and the second, fourth, and eighth fixed phase delays as well as the second, third, and fourth variable phase delays to provide a new $\Sigma$ signal and a new ΔE. The new $\Sigma$ signals are combined in the sixth ring hybrid 61 to produce at terminal 103 a signal substantially the same as the original sum signal and at terminal 105 a new load signal. The new ΔA and ΔE signals are generated at the first and second output terminals 99 and 101. By appropriately adjusting the variable phase delay elements 87 and 89, these signals are reduced to 0; that is, ΔE and ΔA become 0. This adjustment can be performed by manually changing the setting of the variable phase delay elements or, as indicated in FIG. 1, this adjustment can be performed by electrically changing the setting of the variable phase delay elements by the scanner control 19 in any suitable electronic or electromechanical manner.

The variable phase delay elements 91 and 93 are adjusted such that the setting $\psi_2$ of the second variable phase delay element 89 minus the setting $\psi_1$ of the first variable phase delay element 87 divided by 2, i.e.

$$(\psi_2 - \psi_1)/2$$

plus a phase shift of $\pi/2$ is equal to the setting of the setting of the third and fourth variable phase delay elements 91 and 93. When this adjustment is made, the sum signal at terminal 103 is at a value that can be utilized through electronic systems (not shown), in a conventional manner, to provide data on the body being tracked.

It will be appreciated that FIG. 2 provides a simple apparatus for electronically scanning a monopulse pattern to obtain sum-and-difference signals whose values are optimum and are obtained without mechanically moving the antenna for small changes in the movement of a body being tracked by the antenna. Hence, by combining a conventional mechanical antenna moving system with the electronic scanning system a rough and vernier control system for a monopulse tracking antenna is provided.

FIG. 3 is an alternate embodiment of the electronic scanning system of the invention suitable for use with a diamond monopulse tracking system (i.e., in which deviations in the incoming signal are functions of only two of the four RF feed signals). As in FIG. 2, the input terminals are designated as references 43, 45, 47 and 49 and the output terminals are designated as reference numerals 99, 101, 103 and 105. In addition, the designation of inputs and outputs for the ring and square hybrids are the same as the designations in FIG. 2. However, many of the components illustrated in FIG. 2 are eliminated in FIG. 3 because of the manner in which incoming signal deviations are generated in a diamond-monopulse system. More specifically, the system illustrated in FIG. 3 only comprises the first, second, and sixth ring hybrids 51, 53 and 61. However, the system does include the four square hybrids 63, 65, 67 and 69 and the four variable phase delay elements 87, 89, 91 and 93. In addition to these elements, the system illustrated in FIG. 3 only includes four fixed phase delays 107, 109, 111, and 113; each phase delay delays a signal by an amount equal to $\pi/2$.

The system illustrated in FIG. 3 is connected as follows: input terminal 43 is connected to the input $a_1$ of the first ring hybrid 51; and input terminal 45 is connected to the input $a_2$ input of the first hybrid 51. Similarly, input terminal 47 is connected to the $a_1$ input terminal of the second ring hybrid 53 and input terminal 49 is connected to the $a_2$ input of the second ring hybrid 53. Output $b_1$ of the first ring hybrid 51 is connected to $c_2$ of the second square hybrid 65 and terminal $b_2$ of the first ring hybrid 51 is connected to $c_1$ of the second square hybrid 65. Similarly, output terminal $b_1$ of the second ring hybrid 53 is connected to $c_2$ of the first square hybrid 63 and terminal $b_2$ of the second ring hybrid is connected to $c_1$ of the first square hybrid 63.

Output $d_2$ of the first square hybrid 63 is connected to $c_2$ of the third square hybrid 67 and output $d_1$ of the first square hybrid is connected through the first variable phase delay 87 to $c_1$ of the third square hybrid. The $d_2$ output of the second square hybrid 65 is connected to $c_2$ of the fourth square hybrid 69 and the $d_1$ output of the second square hybrid is connected through the second variable phase delay 89 to $c_1$ of the fourth square hybrid.

Output $d_1$ of the third square hybrid 67 is connected through the first fixed phase delay 107 to the input $a_1$ of the sixth ring hybrid 61. Output $d_2$ of the third square hybrid is connected through the second fixed phase delay 109 and the fourth fixed phase delay 113 to the first output terminal 99. The $d_1$ output of the fourth square hybrid 69 is connected through the third variable phase delay 91 to the $a_2$ input of the sixth ring hybrid 61. Output $d_2$ of the fourth square hybrid is connected through the fourth variable phase delay 93 and the third fixed phase delay 111 to the second output terminal 101.

The $b_1$ output of the sixth ring hybrid 61 is connected to the third output terminal 103, and, the $b_2$ output of the sixth ring hybrid is connected to the fourth output terminal 105.

The operaion of FIG. 3 is identical to the operation of FIG. 2. That is, the incoming signals are processed until the ΔA output at the first output terminal 99 equals 0 and until the ΔE output at the second output terminal 101 equals 0. This is accomplished by adjusting the first and second variable phase delays 87 and 89. The variable phase delay elements 91 and 93 are adjusted such that the setting $\psi_2$ of the second variable phase delay 89 minus the setting $\psi_1$ of the first variable phase delay 87 divided by 2, i.e., $(\psi_2 - \psi_1)/2$, plus a phase shift of $\pi/2$ is equal to the setting of the third and fourth variable phase delay elements 91 and 93. As in FIG. 2, the third and fourth variable phase delays are connected together so that their settings are the same.

Further, as in FIG. 2 the sum signal is reproduced at the fourth output terminal 103.

It will be appreciated that the foregoing has described a simple apparatus for electronically scanning a monopulse pattern which acts as a vernier for a mechanical antenna movement system to eliminate the close mechanical tolerances necessary to prior art monopulse antenna control systems. The mechanical system moves the antenna to a rough approximation of the correct position of the body being tracked and the electronic scanning systems scans the antenna patterns to provide an exact indication of the position of the body. When the electronic scanner 15 is adjusted for exact body position, the reproduced sum signal in the direction of the body is at a high value which is almost equal to the maximum value of the scanned sum pattern. Both difference channel intensities in the direction of the body are then equal to zero.

The scanning system is simple and uses waveguides in the form of ring and square hybrids and variable and fixed phase delay elements. In accordance with the invention, the input signals are phase delayed through appropriate waveguide connections so that the system processes the incoming signal to align the electronic boresight axis of the antenna with the body being tracked. That is, while the body is not mechanically aligned with the boresight of the antenna it is electronically aligned. In this manner, a simple means for scanning a monopulse pattern is provided.

While the scanning system is, preferably, formed of square and ring hybrids along with fixed and variable waveguide phase delay elements it will be appreciated by those skilled in the art and others that the scanning system can also be formed of coaxial lines, striplines or other similar RF signal elements.

Further, while the foregoing description has described the deviations of the incoming signal as azimuth and elevation deviations, it is to be understood that these are only for one type of coordinate system. Other coordinate systems are equally suitable, such as a spherical coordinate system or a cartesian coordinate system. In addition, the herein described apparatus has been illustrated for use with an amplitude sensing monopulse system. However, it will be appreciated by those skilled in the art that the system is equally suitable for use with a phase sensing monopulse system. Hence, the invention can be practiced otherwise than as specifically described herein.

What is claimed is:

1. Apparatus for electronically scanning a monopulse tracking signal comprising:
    first means for combining signals from a monopulse antenna to generate sum-and-difference signals, said first means including a plurality of ring hybrids; and
    second means connected to the output of said first means for electronically signal transforming the sum-and-difference output signals of said first means to generate new sum-and-difference signals, said second means including a plurality of square hybrids and phase shifting elements.

2. Apparatus as claimed in claim 1 wherein each ring hybrid has two inputs and two outputs with the inputs and outputs located so that the first output is between the first and second inputs a distance of one-quarter wavelength from each and so that the second input is between the first and second outputs a distance of one-quarter wavelength from each.

3. Apparatus as claimed in claim 2 including a third means connected between said first and second means for splitting the sum signal from said first means into a pair of signals each equal to the original sum signal divided by the square root of 2.

4. Apparatus as claimed in claim 3 wherein said plurality of ring hybrids equals 4 and wherein the inputs to said first and second hybrids are adapted to receive the four input signals from said monopulse antenna;
    and wherein the first output of said first ring hybrid is connected to the second input of said third ring hybrid, the second output of said first ring hybrid is connected to the second input of said fourth ring hybrid, the first output of said second ring hybrid is connected to the first input of said third ring hybrid, and the second output of said second ring hybrid is connected to the first input of said fourth ring hybrid.

5. Apparatus as claimed in claim 4 wherein said third means is a fifth ring hybrid having two inputs and two outputs with the inputs and outputs located so that the first output is located between the first and second inputs a distance of one-quarter wavelength from each and the second input is located between the first and second outputs a distance of one-quarter wavelength from each;
    and wherein the first output of said third ring hybrid is connected to the second input of said fifth ring hybrid, the first input of said fifth ring hybrid is connected to a load, and the first output of said fourth ring hybrid is connected to a load.

6. Apparatus as claimed in claim 5 wherein said second means includes:
    four square hybrids, each having two inputs and two outputs the inputs and outputs sharing adjacent corners;
    eight fixed phase delay elements;
    four variable phase delay elements;
    a sixth ring hybrid having two inputs and two outputs with the inputs and outputs located so that the first output is between the first and second inputs a distance of one-quarter wavelength from each and so that the second input is between the first and second outputs a distance of one-quarter wavelength from each;
    the second output of said fifth ring hybrid connected to the first input of said first square hybrid;
    the second output of said fourth ring hybrid connected through said first fixed phase delay element to the second input of said first square hybrid;
    the first output of said fifth ring hybrid connected to the first input of said second square hybrid;
    the second output of said third ring hybrid connected through said second fixed phase delay element to the second input of said second square hybrid;
    the first output of said first square hybrid connected through said first variable phase delay element to the first input of said third square hybrid;
    the second output of said first square hybrid connected through the said third fixed phase delay element device to the second input of said third square hybrid;
    the first output of said second square hybrid connected through said second variable phase delay element to the first input of said fourth square hybrid;
    the second output of said second square hybrid connected through said fourth fixed phase delay element to the second input of said fourth square hybrid;
    the second output of said third square hybrid connected through said fifth fixed phase delay element to the first input of said sixth ring hybrid;
    the first output of said third square hybrid connected through said sixth and seventh fixed phase delay elements to a first output;
    the second output of said fourth square hybrid connected through said third variable phase delay element to the second input of said sixth ring hybrid;
    the first output of said fourth square hybrid connected through said fourth variable phase delay element and said eighth fixed phase delay element to a second output;
    the first output of said sixth ring hybrid connected to a third output; and
    the second output of said sixth ring hybrid connected to a fourth output.

7. Apparatus as claimed in claim 6 wherein said fixed phase delay elements delay a signal by an amount equal to $\pi/2$ and wherein said third and fourth variable phase delay elements are varied together.

8. Apparatus as claimed in claim 2 wherein said plurality of ring hybrids equals 2 and wherein the inputs to said first and second hybrids are adapted to receive the four input signals from said monopulse antenna.

9. Apparatus as claimed in claim 8 wherein said second means includes:
    four square hybrids, each having two inputs and two outputs, the inputs and outputs sharing adjacent corners;
    four fixed phase delay elements;
    four variable phase delay elements;
    a third hybrid having two inputs and two outputs with the inputs and outputs located so that the first output is between the first and second inputs a distance of one-quarter wavelength from each and so that the second input is between the first and second outputs a distance of one-quarter wavelength from each;
    the second output of said second ring hybrid connected to the first input of said first square hybrid;
    the second output of said first ring hybrid connected to the first input of said second square hybrid;
    the first output of said second ring hybrid connected to the second input of said first square hybrid;
    the first output of said first ring hybrid connected to the second input of said second square hybrid;

the first output of said first square hybrid connected through said first variable phase delay element to the first input of said third square hybrid;

the second output of said first square hybrid connected to the second input of said third square hybrid;

the first output of said second square hybrid connected through said second variable phase delay device to the first input of said fourth square hybrid;

the second output of said second square hybrid connected to the second input of said fourth square hybrid;

the first output of said third square hybrid connected through said first fixed phase element device to the first input of said third ring hybrid;

the second output of said third square hybrid connected through said second and third fixed phase delay elements to a first output;

the first output of said fourth square hybrid connected through said third variable phase delay element to the second input of said third ring hybrid;

the second output of said fourth square hybrid connected through said fourth phase variable delay element and said fourth fixed phase delay element to a second output;

the first output of said third ring hybrid connected to a third output; and the second output of said sixth ring hybrid connected to a fourth output.

10. Apparatus as claimed in claim 9 wherein said fixed phase delay elements delay a signal by an amount equal to $\pi/2$ and wherein said third and fourth variable phase delay elements are varied together.

References Cited

UNITED STATES PATENTS

| | | | |
|---|---|---|---|
| 3,243,805 | 3/1966 | Smith | 343—7.4 |
| 3,308,468 | 3/1967 | Hannan | 343—777 |

RODNEY D. BENNETT, Jr., *Primary Examiner.*

T. H. TUBBESING, *Assistant Examiner.*

U.S. Cl. X.R.

343—7.4, 16, 777